(12) United States Patent
Ekstrom et al.

(10) Patent No.: US 10,091,538 B2
(45) Date of Patent: Oct. 2, 2018

(54) AUTOMATED VIDEO CONTENT PROCESSING

(71) Applicant: ECHOSTAR TECHNOLOGIES L.L.C., Englewood, CO (US)

(72) Inventors: Joseph Ekstrom, Lindon, UT (US); Jeremy Pfeifer, Riverton, UT (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 69 days.

(21) Appl. No.: 14/986,214

(22) Filed: Dec. 31, 2015

(65) Prior Publication Data

US 2016/0191954 A1 Jun. 30, 2016

Related U.S. Application Data

(60) Provisional application No. 62/098,866, filed on Dec. 31, 2014.

(51) Int. Cl.
| | | |
|---|---|---|
| *G06F 21/10* | (2013.01) | |
| *H04N 21/2347* | (2011.01) | |
| *H04N 21/266* | (2011.01) | |
| *H04N 21/236* | (2011.01) | |
| *H04N 21/2343* | (2011.01) | |
| *H04N 21/6334* | (2011.01) | |
| *H04N 21/845* | (2011.01) | |

(52) U.S. Cl.
CPC ......... *H04N 21/2347* (2013.01); *G06F 21/10* (2013.01); *H04N 21/2343* (2013.01); *H04N 21/23605* (2013.01); *H04N 21/26606* (2013.01); *H04N 21/63345* (2013.01); *H04N 21/8456* (2013.01); *G06F 2221/0753* (2013.01)

(58) Field of Classification Search
CPC ......... H04N 21/2347; H04N 21/26606; H04N 21/8456; H04N 21/2343; H04N 21/63345; H04N 21/23605; G06F 21/10; G06F 2221/0753
USPC ....................................................... 380/201
See application file for complete search history.

(56) References Cited

U.S. PATENT DOCUMENTS

| | | | |
|---|---|---|---|
| 8,612,624 B2 | 12/2013 | Frueck et al. | |
| 8,621,099 B2 | 12/2013 | Curtis | |
| 8,838,826 B2 | 9/2014 | Galanes et al. | |
| 2011/0158610 A1 | 6/2011 | Paul et al. | |
| 2013/0298154 A1 | 11/2013 | Panigrahi | |
| 2014/0282784 A1* | 9/2014 | Pfeffer | H04N 21/64322 725/112 |

(Continued)

OTHER PUBLICATIONS

The International Bureau of WIPO, International Preliminary Report on Patentability for International Application No. PCT/US2015/068302 dated Jul. 13, 2017.

(Continued)

*Primary Examiner* — Kambiz Zand
*Assistant Examiner* — Benjamin Kaplan
(74) *Attorney, Agent, or Firm* — Lorenz & Kopf, LLP

(57) ABSTRACT

Video content is processed for delivery using an automated process that allows for convenient packaging of encrypted or digital rights management (DRM) protected content in a manner such that the packaged content can be efficiently stored in a content delivery network (CDN) or other content source for subsequent re-use by other media clients without re-packaging, and without excessive storage of unused content data.

15 Claims, 2 Drawing Sheets

(56) References Cited

U.S. PATENT DOCUMENTS

Figure 1:
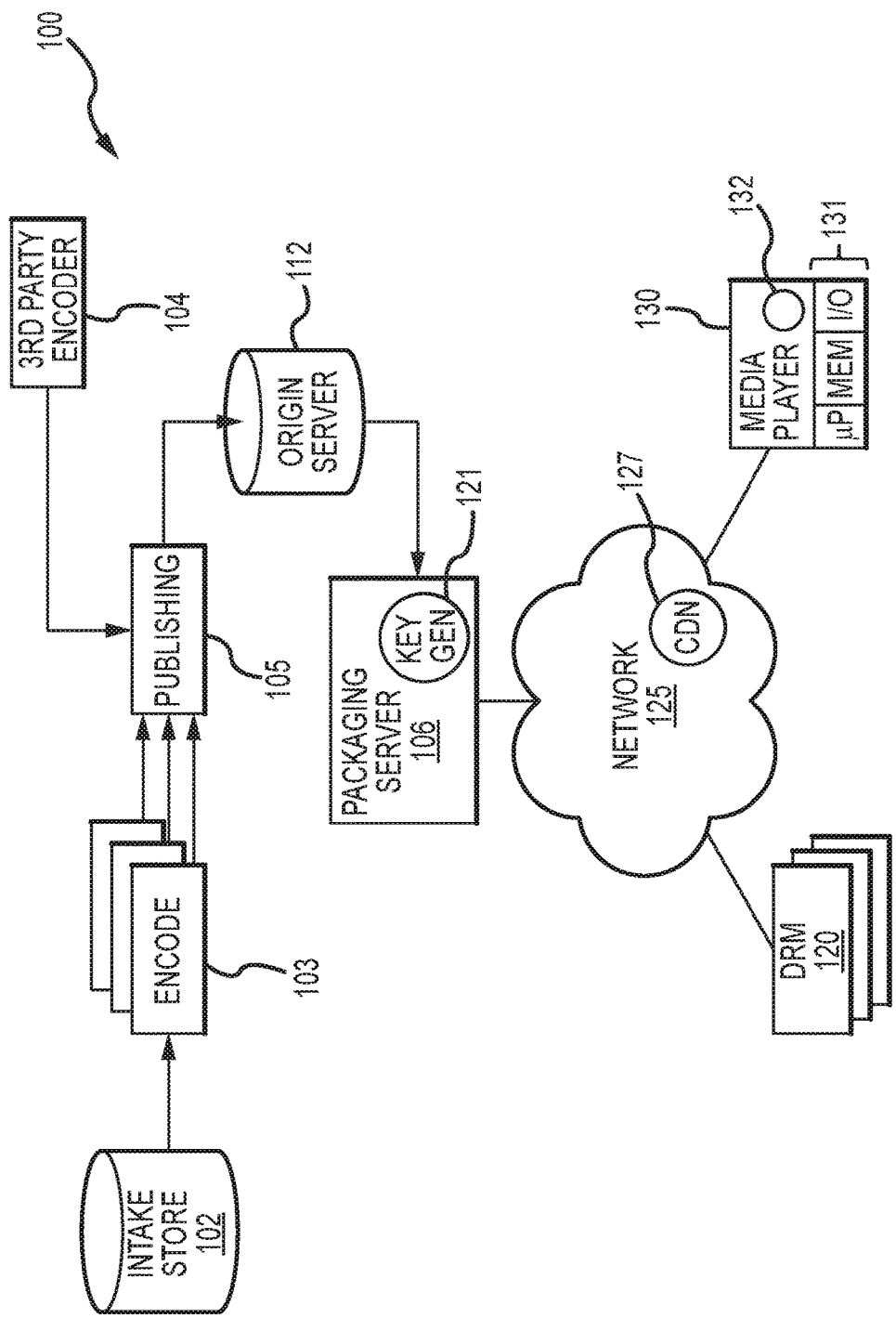

| | | | | |
|---|---|---|---|---|
| 2015/0150038 A1* | 5/2015 | Hao | ............... | G06F 21/00 |
| | | | | 725/31 |
| 2016/0191476 A1* | 6/2016 | Schutz | ............... | H04L 63/06 |
| | | | | 713/165 |
| 2016/0198202 A1* | 7/2016 | Van Brandenburg | ............... | |
| | | | | H04N 21/26258 |
| | | | | 725/31 |

OTHER PUBLICATIONS

TM-Wowza Media Systems et al.: "Wowza Streaming Engine—Overview", Feb. 1, 2014, Retrieved from the Internet: URL: https://www.wowza.com/uploads/wowza4/documents/WowzaStreamingEngine-Product-Overview_final.pdf (Retrieved May 19, 2016).

Anevia: "ViaMotion Server Anevia OTT Solution Description", Oct. 17, 2013, Retrieved from the Internet: May 19, 2016, Internet Archive Wayback Machine for link URL: http://deps.ua/downloads/Solutions/Anevia_OTT_TV_Solution.pdf.

International Search Report and Written Opinion, International Application No. PCT/US2015/068302, dated Apr. 4, 2016.

IP Australia, Examination report No. 1 for standard patent application in Australian Patent Application No. 2015373940 dated Feb. 22, 2018.

\* cited by examiner

AUTOMATED VIDEO CONTENT PROCESSING

PRIORITY CLAIM

This application claims priority to U.S. Provisional Application Ser. No. 62/098,866, filed on Dec. 31, 2014, which is incorporated herein by reference.

TECHNICAL FIELD

The present disclosure generally relates to delivering video content over the Internet or another network. More particularly, the following discussion relates to efficient video distribution of video content over a network through automated management of video packaging, caching and digital rights management.

BACKGROUND

Video streaming services are becoming increasingly popular. Many different video on demand (VOD) services now allow viewers to obtain television programs, movies, sports and other types of video content directly over the Internet or a similar network. Most VOD services therefore maintain large libraries of video content to ensure an interesting variation of programming for their customers.

As the number of available media programs increases, however, additional costs are typically incurred for processing and storing the additional content. Generally speaking, each available program is encoded, packaged, checked for quality, and stored before it is made available to viewers. Each of these steps can require expensive computing and storage resources. Moreover, most modern VOD systems make use of content delivery networks (CDNs) to store multiple copies of media contents for convenient delivery to viewers in widely-varying geographic locations. CDN services can be expensive, particularly when nation-wide or even world-wide delivery is expected. Still further, most modern adaptive streaming techniques require that each video be encoded multiple times to create multiple copies of varying quality.

It is therefore desirable to create systems and methods for efficiently and effectively delivering video content over the Internet or another network. These and other desirable features and characteristics will become apparent from the subsequent detailed description and the appended claims, taken in conjunction with the accompanying drawings and this background section.

BRIEF SUMMARY

Various embodiments provide efficient processing of video on demand content for delivery to different types of media players and other client devices. Video content is processed for delivery using an automated process that allows for convenient packaging of encrypted or digital rights management (DRM) protected content in a manner such that the packaged content can be efficiently stored in a content delivery network (CDN) or other content source for subsequent re-use by other media clients without re-packaging, and without excessive storage of unused content data.

In an example embodiment, an automated process is executed by a data processing system to pre-package streaming video programs for delivery to multiple client devices via a network. The process suitably comprises: receiving, at a packaging system, a request for a particular streaming video program to be delivered to a first client device from a content delivery network; in response to the request, obtaining program files corresponding to the particular streaming video program from an origin server; encrypting the obtained program files of the particular streaming video program using a cryptographic key; delivering the encrypted program files to the content delivery network for delivery to the first client device; and delivering the cryptographic key to a digital rights management service associated with the first client device to thereby allow the first client device to obtain the cryptographic key and to decrypt the encrypted program files and thereby playback the particular streaming video program. Other embodiments provide a packaging server or other data processing system implemented with a processor and a memory, wherein the processor executes any of the automated processes described herein.

Still other embodiments provide a data processing system to provide streams of encoded media content to client devices via a network. The data processing system is implemented using any number of different servers or other computer systems. In an example embodiment, the data processing system comprises a publishing system that formats the encoded media content for distribution on the network; an origin server that stores the encoded media content prior to distribution on the network; and a packaging server configured to execute an automated process to pre-package streaming video programs for delivery to the client devices via the network as set forth herein.

Additional embodiments could provide other systems, devices, remote devices, media players, software programs, encoders, processes, methods and/or the like that perform these or other functions. Various embodiments, aspects and features are described in detail below.

BRIEF DESCRIPTION OF THE DRAWING FIGURES

Figure 2:
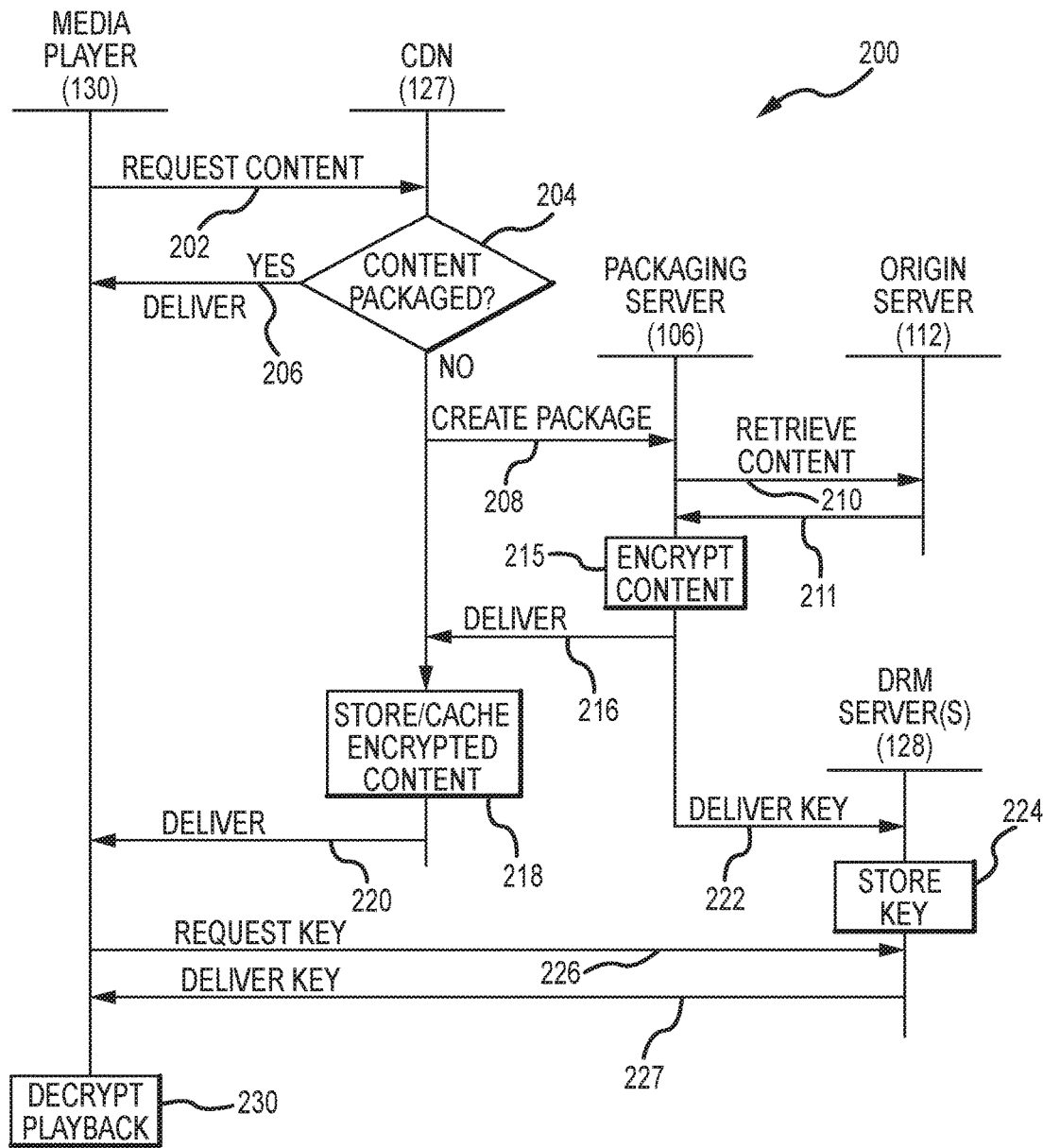

Example embodiments will hereinafter be described in conjunction with the following drawing figures, wherein like numerals denote like elements, and FIG. 1 is a block diagram showing an example of a distribution system for delivering video content via a network; and FIG. 2 shows an example process for delivering video content.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a data processing system is provided to process raw media content (e.g., television programs, movies, and other content) for a video on demand (VOD) type services. Typically, content is encoded and packaged on demand for a particular type of client (e.g., a particular brand of phone or other media player device, or a particular media player client). The encoded content is packaged with appropriate digital rights management (DRM) for that media client and delivered to the media player for playback. The packaged content can also be stored in a cache (e.g., a CDN 127 associated with the Internet or other network 125) so that subsequent requests for the same content that are received from other media players of the same type as the originally-requesting player can be processed from the cache, without the need to re-package or re-secure with additional DRM. While this may consume additional processing resources to package the initial request, many embodiments will consume substantially less cache storage (since only versions that are actually used need to be cached). Moreover, the need to live encode future DRM can be reduced if the DRM can be re-used by other secure clients, as described herein.

Many modern media delivery systems use different types of encoding and DRM to deliver content to different types of clients. Apple devices, for example, typically use FairPlay DRM, whereas Microsoft products (e.g., Xbox media players and Windows Media Player) use PlayReady DRM, and Android players typically use Widevine DRM. A content delivery service that supports multiple media player clients, then, must typically support multiple types of DRM. Moreover, adaptive media delivery typically involves the encoding of multiple copies of each program to ensure proper quality levels are available for delivery. While the fastest delivery technique would typically involve encoding each program at each quality level with each DRM type, this would result in a substantial demand for processing resources, as well as substantial data storage requirements. Data storage could be particularly expensive if the pre-encoded content is stored in a commercial CDN, which typically charges based upon the amount of data that is cached.

It is far more efficient, then, to fractionalize the content based upon the operating system (e.g., iOS, Android, Windows, etc.) or device type (e.g., iPhone, Android phone, Apple brand tablet, Microsoft brand tablet, Android tablet, etc.) rather than the program itself, since different devices use different DRM techniques and services. Different devices may also have different profiles: a mobile phone may require lower quality than a home-type media player (e.g., a Roku, Apple TV, ChromeCast or similar device), for example, due to the smaller screen. Encoding quality may be considered in addition to DRM type to create a manageable number of encoding profiles for different devices. Each profile can then be packaged, protected with a cryptographic key, and stored in the cache for convenient delivery. The cryptographic key can be securely delivered for the different media packages using any number of different DRM types. This ensures relatively quick delivery for at least the most common devices without requiring packaging and storage of data that is unlikely to be requested.

Turning now to the drawing figures and with initial reference to FIG. 1, an example video processing and delivery system 100 is shown. The system 100 illustrated in FIG. 1 includes a video server system that encodes and delivers video programs to one or more remotely-located video player clients 130 via the Internet or another network 125. Some programs may be encoded in advance of delivery and stored in storage no and/or content delivery network (CDN) 127 for immediate retrieval. Other programs, however, are encoded and/or packaged on an as-needed basis using a packaging system 106 that retrieves the content from the origin server 112, packages a video stream with appropriate digital rights management (DRM) for the device requesting the content, and supplies the encoded video package to a content delivery network (CDN) 127 for delivery to the media player client device 130. The package that is formed for a particular client may be maintained in cache storage with the CDN 127 for an appropriate period of time; when subsequent requests are received for the same content to be delivered to the same type of device (or otherwise having the same parameters are the earlier package), then the previously-packaged stream can be delivered by the CDN 127 without additional encoding, DRM and other processing. Because the video content is packaged as-needed for a particular client 130, the storage/caching may be limited to only the formats and quality levels that are actually used, thereby greatly reducing the amount of storage space that would be required for appropriate delivery. That is, it is no longer necessary to encode, DRM protect and store packages that may not be used, thereby freeing up storage and reducing costs. Additional details are set forth below.

Video server system 100 suitably includes an intake store 102, a bulk video encoding system 103, an origin server 112, a publishing system 105 and a packaging system 106 as appropriate. Each of the components of server system 101 is typically implemented using conventional computing hardware and software, including any sort of cloud-based data processing capabilities, as desired. Each of the components therefore typically includes a conventional processor that is capable of executing software or firmware programs that are stored in memory or mass storage to execute the various functions and processes described herein.

Origin server 112 is a computerized server that delivers media content 119 to one or more remotely-located media player devices 130 via network 125. In various embodiments, origin server 112 is implemented using one or more conventional network server systems that incorporate any number of processors, memory, input/output interfaces and/or the like. Typically, origin server 112 executes a software or firmware program that implements the various functions described herein. Equivalent embodiments could use cloud-based computing resources to implement origin server 112, as desired. Still other embodiments may implement origin server 112 using any number of inter-operating computing systems, such as any sub-systems that provide user authentication/authorization, digital rights management (DRM), cryptography, billing, interface handling, redundant processing, load balancing and/or other functions as appropriate.

Encoding systems 103 retrieve raw program content from intake store 102 and compress or otherwise format the program data for delivery on network 125. Intake store 102 is a database or other repository for received media programs prior to processing for delivery. In various embodiments, intake store 102 is a database system (including conventional processing, memory and input/output capabilities) that receives and stores master files prior to encoding or further processing. Such master files may be lightly compressed (or even uncompressed) mezzanine files, MPEG transport streams (TS) received via a satellite, cable or terrestrial broadcast, and/or another type of source content received from a content owner, distributor, broadcast and/or other source. In some embodiments, intake store 102 may perform some initial processing on the received content (e.g., tagging or otherwise identifying the received content), although primary compression and other encoding will typically occur at later stages.

As noted above, at least some programs may be encoded a priori for storage on a CDN 127 or the like. Typically, encoding of such programs will be handled by a bulk encoder system 103 that provides encoding into one or more appropriate formats and qualities. U.S. Pat. No. 8,621,099 assigned to Sling Media Inc. of Foster City, Calif. describes one example of a cloud-based bulk media intake/encoding system, although other embodiments could use any other systems and processes as desired.

One or more encoders 103 suitably convert content from the master file format maintained in content store 102 to one or more compressed formats for distribution on network 125. In various embodiments, content may be converted from MPEG or other source formats into any number of different formats to ensure compatibility with different types of devices and media players 130. Alternatively, content received in any number of different formats may be encoded into a common MPEG transport stream or similar format, as desired. For adaptive streaming, encoder 103 may encode two or more different bit rates, frame rates, resolutions or other qualities as appropriate so that the media stream may be adapted during transmission to the player 130. U.S. Pat. No. 8,612,624 assigned to Echostar Technologies of Englewood, Colo. describes several types of adaptive streaming techniques, although equivalent embodiments could use any other types and formats for adaptive encoding and streaming as desired. Many VOD services maintain a substantial number of different copies of each video due to the wide range of formats and video qualities that are supported.

Various embodiments could additionally or alternately receive content that is already encoded in the desired directly from the producer of the content (e.g., a television network) or another third party service 104, as desired. In such cases, it may not be necessary to further encode the video content, although it may still be desirable to package and publish the content in the same manner as content encoded by encoders 103, as described more fully herein.

Various embodiments additionally provide a publishing service 105 that formats the encoded video content in a suitable manner for distribution/publishing on network 125. Publishing service 105 is typically implemented using a digital computing system having a processor and memory capable of executing software, firmware or other programmed logic to execute the various functions and processes described herein. Publishing service 105 may be equivalently implemented using cloud-type processing services that abstract the data processing hardware, as desired.

In operation, publishing service 105 is able to re-organize or realign the encoded content for proper formatting and timing in accordance with the streaming media formats supported by the media player 130. This re-organization may involve renaming segment or other data files, for example, so that the file names are compliant with a URL or other addressing scheme used by the media player 130 or by CDN 127. Publishing service 105 may also create appropriate metadata to describe data segments, data files or the like that can be retrieved by the media player. This metadata may ultimately be delivered in a digest to the media player 130 to allow the player to request appropriate content files in an adaptive streaming session, for example.

The publishing server 105 therefore places encoded content and/or content received directly from third parties 104 into a suitable format that can be stored in origin server 112 and further processed by packaging server 106. This format will typically include sets of data segments that can be individually retrieved by media players 130 using HTTP or similar constructs via network 125.

The encoded and formatted media content is typically stored with an origin server 112 prior to delivery to media players 130. Origin server 112 is typically a conventional file server system that stores individually-accessible data files for retrieval by media player devices 130 operating on network 125. In various embodiments, file server 112 acts as an origin server for CDN 127; that is, files retrieved from the origin server 112 can be redistributed and cached at various geographically-dispersed servers throughout CDN 127 so that subsequent requests for the same content that are received from other media players 130 can be processed more quickly.

To that end, content can be packaged prior to delivery by packaging server 106, which creates a bundle that can be stored with origin server 112 and/or CDN 127 for delivery to media players 130 as appropriate. The formatting and distribution of video content will vary from embodiment to embodiment. In many implementations, it will be beneficial to perform a quality assurance analysis on the completed package to ensure that formatting and encoding were performed correctly. Quality assurance will typically identify any encoding or formatting errors prior to distribution, but it can consume additional processing resources. Packaging system 106 may be implemented using any sort of conventional computing hardware, including any sort of processor, memory and input/output interfaces. Other embodiments may use cloud-based hardware (e.g., the cloud-based server systems available from Amazon Web Services or the like).

As noted above, encoded and packaged content 118 may be stored in a origin or other file storage 112 for subsequent delivery to media players 130 via network 125. In many embodiments, origin server 112 handles requests for content 119 from media players 130. If the requested content is already encoded, then the encoded content can be retrieved from storage for delivery and/or caching with CDN 127. Future requests for the same content by the same or other media players 130 may then be redirected toward CDN 127 for more effective delivery without consulting origin server 112, as desired.

Media player device 130 is any sort of media player, computer system, mobile phone, tablet, video game player, television, television receiver, set top box, video recorder and/or other device that is capable of receiving streaming media content via network 125. Typically, media player device 130 includes any sort of conventional hardware 131 such as a processor, memory, input/output interfaces and/or the like to carry out the various functions and processes set forth herein. In various embodiments, media player device 130 executes a software application 132 that is stored in memory and executed by the processor to carry out the various functions described herein. Software application 132 may include an application program interface (API) or software development kit (SDK) that is compatible with system 100 in general, and/or publishing system 105 in particular, to allow delivery of live encoded video streams. Application 132 may include a placeshifting or media player client, for example, that is developed to be compatible with encoding and delivery system 100, as described herein.

Typically, viewers operate a user interface of media player 130 to select and retrieve video content from server 112 via network 125. In many implementations, server 112 stores at least some of the available video content with one or more content delivery networks (CDNs) 127. CDN 127 typically maintains any number of edge servers that are geographically and/or logically distributed throughout network 125 so that users in any location can obtain relatively streamlined access to requested video files. In many embodiments, the media player 130 initially contacts server 112 directly for authentication, authorization and/or access to lists of available programs. When a desired program is selected, media player 130 may be redirected to an edge server affiliated with CDN 127 that is closer to the requesting media player 130 or that can otherwise provide more efficient delivery than the origin server 112. Typically, each edge server in CDN 127 initially receives encoded content from origin server 112. The received content may be cached at least temporarily in case another media player 130 requests the same content from the same edge server. As noted above, however, CDN services are typically relatively expensive, so caching unpopular programs 118 with a CDN 127 may result in unnecessary cost.

When a pre-encoded version of a requested program 118 is not available within system 100, media player 130 interacts with system 100 to obtain a suitable media package created for the particular media player 130. Generally speaking, the package that is created will be based upon the appropriate video format, DRM type, and/or quality levels for the particular type of device 130.

To that end, system 100 will typically respond to a request from the media player 130 by obtaining un-encoded content from intake store 102, encoding the appropriate formats for media player 130, encrypting the content as appropriate, packaging the encoded content with suitable DRM for that player, and delivering the encoded package to the media player device 130 for playback. The encoded package may also be cached with CDN 127 or the like for delivery to other media players of the same type as player 130 that request the same content in the future.

Content may not be live encoded; in some embodiments, the content is encoded a priori into an appropriate number of formats and quality levels for storage associated with origin server 112. The appropriately-formatted content may nevertheless be retrieved from storage 112 and packaged in response to a request from a media player 130, as desired, if the particular DRM scheme allows.

Packaging suitably involves obtaining the video and audio content for the requested programming in the appropriate format and/or at appropriate levels for the requesting media player, encrypting the content with a suitable cryptographic key, and assigning appropriate DRM for the package. In various embodiments, content may be encrypted before or after encoding, and/or DRM may be applied prior to delivery as described herein. In an example embodiment, packaging system 106 includes a cryptographic key store 121 that generates keys of suitable length according to any appropriate algorithm or process, which is usually defined by the relevant DRM service. Cryptographic keys are typically used to generate symmetric or asymmetric encryption, digital signatures and/or other features as defined by the DRM standard that is applied. Keys may then be shared with the DRM service using secure protocols (and/or other techniques, including secure physical links) for subsequent retrieval by media player(s) 130. When media player 130 retrieves the package of encoded content via network 125, it appropriate contacts DRM service 120 to obtain the needed key; the key maybe re-used, in some embodiments, for other media players 130 of the same type to prevent re-encoding or re-packaging by system 100. The media package that is created, then, can be stored on the CDN 127 for subsequent delivery to multiple devices 130, which each obtain the appropriate key for decryption and viewing through the appropriate DRM service 120.

FIG. 2 shows on example of a process 200 that could be used to securely package, cache and deliver video content within system 100. With reference now to FIG. 2, the media player 130 or other client device suitably requests desired content from the CDN 127 or another source operating via network 125 (function 202). If the content source 127 has packaged content ready for delivery (function 204), then the pre-packaged and pre-stored content is simply delivered to the client device 130. The media player device 130 is then able to jump directly to contacting the appropriate DRM service 120 to request appropriate decryption keys (functions 226, 227) and to play back the pre-packaged content (function 230) using the received keys.

If the CDN 127 does not have pre-packaged content already cached for immediate delivery (function 204), then a new package is created from content in the origin server 112. CDN 127 (or another appropriate content delivery service on network 125) suitably contacts the packaging service 106 of system 100 (function 208) to initiate package creation. In various embodiments, message 208 will indicate the type of client device 130 that is requesting the content, and/or any other information to assist in obtaining content of appropriate quality, resolution, etc. for that particular device. The appropriate content files are requested (function 210) from the origin server 112 and delivered to the packaging service (function 211) for encryption, quality control and/or other packaging services as desired (function 215). In various embodiments, the packaging service 106 includes a key store 121 that generates appropriate cryptographic keys (e.g., using any symmetric or asymmetric key generation techniques and appropriate key lengths) for encrypting the retrieved content. The cryptographic keys used to encrypt the content may be maintained in the key store 121 for subsequent retrieval; in various embodiments, keys are pushed to one or more DRM services 120 for a priori storage by the DRM service, as desired. In various embodiments, the encrypted content is assigned an identifier that allows convenient recognition and pairing to keys delivered through separate DRM services, as desired. The encrypted content is then delivered 216 to the CDN 127 for caching 218. The encrypted content may be delivered to media player 130 (function 220) via the CDN 127, as shown in FIG. 2, although equivalent embodiments could deliver the encrypted content directly from the packaging service 106 instead of passing through CDN 127, as desired.

Many commercially-available CDNs 127 are able to process different types of DRM automatically, or DRM packaging may be part of the processing 215 performed by packaging server 106. In various embodiments, the key store 121 or service 106 suitably delivers the appropriate cryptographic keys (and any associated identifiers for content encrypted with the generated key) to one or more DRM services 120. In some examples, packages encrypted with the same key may be delivered to different types of devices that use different DRM providers. Each of the different client devices 130 is able to retrieve the key via its own DRM provider. To that end, key store 121 suitably delivers the generated keys and identifiers to the different DRM providers, each according to their own requirements. The NAGRA and SECURE MEDIA DRM services, for example, typically operate with a priori knowledge of keys, so keys are pushed to these services as soon as possible after they are generated, or in any event prior to the client devices 130 requesting the packaged content from CDN 127. In the example illustrated in FIG. 2, key 222 is delivered to CDN service 120 so that it can be stored (function 224) for immediate delivery 227 when a subsequent request 226 is received from the client 130. In other embodiments, CDN services 120 such as WIDEVINE, PLAY READY, FAIRPLAY and the like typically prefer to request keys from the key store 121 on an as-needed basis. In such cases, the DRM service 120 will typically request the key from key store 121 in response to a request 226 received from the client device 130. In either event, the key can be securely delivered to the client device 130 (function 227) so that the client can decrypt the content package and play back the desired media content (function 230). As noted above, the same package of encrypted content stored at CDN may be delivered to multiple client devices 130 (including different types of client devices 130 using different DRM services 120) as desired. This allows for very efficient delivery of media content using CDN 127 without incurring unnecessary overhead that would otherwise result from storing multiple copies of the same video (many of which would remain unused) of the same content with the CDN 127.

The various processes, devices and systems described herein may be readily adapted for any number of equivalent environments and applications. For example, although the foregoing discussion frequently refers to video on demand services, equivalent embodiments could be used to process any other types of streaming video content, including content streamed from a remote service digital video recorder (RSDVR), placeshifting device, media server or the like. Any number of alternate but equivalent embodiments could be formulated as desired.

The term "exemplary" is used herein to represent one example, instance or illustration that may have any number of alternates. Any implementation described herein as "exemplary" is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process executed by a data processing system to pre-package streaming video programs for delivery to multiple client devices via a network, the process comprising:
   receiving, at a packaging system, a request for a particular streaming video program to be delivered to a first client device from a content delivery network, wherein the request indicates a type of the first client device;
   in response to the request, selecting program files of the particular streaming video program based upon the type of the first client device that is indicated in the request and obtaining the selected program files from an origin server;
   encrypting the selected program files of the particular streaming video program obtained from the origin server using a cryptographic key;
   delivering the encrypted program files to the content delivery network for delivery to the first client device; and
   separately delivering the cryptographic key to a digital rights management service associated with the type of the first client device that is indicated in the request to thereby allow the first client device to obtain the cryptographic key via the digital rights management service and, after obtaining the cryptographic key via the digital rights management service, to decrypt the encrypted program files using the cryptographic key and thereby playback the particular streaming video program.

2. The automated process of claim 1 wherein the content delivery network caches the encrypted program files for subsequent delivery to a second client device that is different from the first client device.

3. The automated process of claim 2 wherein the second client device is a same type of device as the first client device, and wherein the second client device obtains the same cryptographic key to decrypt the encrypted program files from the same digital rights management service.

4. The automated process of claim 2 wherein the second client device is a different type of device from the first client device, and wherein the second client device obtains the same cryptographic key to decrypt the encrypted program files via a different digital rights management service.

5. The automated process of claim 3 wherein delivering the cryptographic key comprises delivering the key to the digital rights management service before the second client device requests the key from the digital rights management service.

6. The automated process of claim 1 wherein delivering the cryptographic key comprises delivering the key to the digital rights management service in response to a request received from the digital rights management service.

7. The automated process of claim 1 further comprising receiving raw content in an intake store and encoding the raw content to create encoded program files for storage on the origin server.

8. The automated process of claim 7 further comprising processing the encoded program files by a publishing system to format the encoded program files in a format comprising a plurality of program segments that is compatible with adaptive streaming on the network prior to storage of the encoded program files on the origin server.

9. The automated process of claim 8 wherein the processing by the publishing system further comprises creating metadata describing the encoded program files, and wherein the metadata is deliverable to the client device to thereby allow the client device to adaptively select the segments of the encoded program files corresponding to the particular streaming video program from the content delivery network.

10. A data processing system having a processor and a memory, wherein the processor executes an automated process to pre-package streaming video programs for delivery to multiple client devices via a network, the process comprising:
    receiving, at the data processing system, a request for a particular streaming video program to be delivered to a first client device from a content delivery network, wherein the request indicates a type of the first client device;
    in response to the request, selecting program files of the particular streaming video program based upon the type of the first client device that is indicated in the request and obtaining the selected program files from an origin server;
    encrypting the selected program files of the particular streaming video program obtained from the origin server using a cryptographic key;
    delivering the encrypted program files to the content delivery network for delivery to the first client device; and
    separately delivering the cryptographic key to a digital rights management service associated with the type of the first client device that is indicated in the request to thereby allow the first client device to obtain the cryptographic key via the digital rights management service and, after obtaining the cryptographic key via the digital rights management service, to decrypt the encrypted program files using the cryptographic key and thereby playback the particular streaming video program.

11. The data processing system of claim 10 wherein the content delivery network caches the encrypted program files for subsequent delivery to a second client device that is different from the first client device.

12. The data processing system of claim 11 wherein the second client device is a same type of device as the first client device, and wherein the second client device obtains the same cryptographic key from the same digital rights management service to decrypt the encrypted program files that are cached by the content delivery network.

13. The data processing system of claim 11 wherein the second client device is a different type of device from the first client device, and wherein the second client device obtains the same cryptographic key to decrypt the same encrypted program files cached by the content delivery network from a different digital rights management service.

14. A data processing system to provide streams of encoded media content to client devices via a network, the data processing system comprising:
   a publishing system that formats the encoded media content for distribution on the network;
   an origin server that stores the encoded media content prior to distribution on the network; and
   a packaging server configured to execute an automated process to pre-package streaming video programs for delivery to the client devices via the network, the automated process comprising:
      receiving, at the packaging server, a request for a particular streaming video program to be delivered to a first one of the client devices from a content delivery network, wherein the request indicates a type of the first client device;
      in response to the request, selecting program files of the particular streaming video program based upon the type of the first client device that is indicated in the request and obtaining the selected program files from the origin server;
      encrypting the selected program files of the particular streaming video program obtained from the origin server using a cryptographic key;
      delivering the encrypted program files to the content delivery network for delivery to the first client device; and
      separately delivering the cryptographic key to a digital rights management service associated with the type of the first client device that is indicated in the request to thereby allow the first client device to obtain the cryptographic key via the digital rights management service and, after obtaining the cryptographic key via the digital rights management service, to decrypt the encrypted program files using the cryptographic key and thereby playback the particular streaming video program.

15. The data processing system of claim 14 further comprising at least one encoder configured to retrieve raw program content from an intake store and to encode the raw program content to create the encoded media content.

* * * * *